United States Patent [19]

Kano et al.

[11] Patent Number: 4,858,716
[45] Date of Patent: Aug. 22, 1989

[54] TWO WHEEL/FOUR WHEEL DRIVE CHANGE OVER APPARATUS FOR FOUR-WHEEL DRIVE VEHICLES

[75] Inventors: Junichi Kano, Kariya; Kongo Aoki, Toyota, both of Japan

[73] Assignee: Aisin Seiki-Kabushiki Kaisha, Kariya, Japan

[21] Appl. No.: 102,843

[22] Filed: Sep. 30, 1987

[30] Foreign Application Priority Data

Sep. 30, 1986 [JP] Japan .................................. 61-231559

[51] Int. Cl.⁴ ............................................ B60K 23/08
[52] U.S. Cl. ....................................... 180/233; 60/413;
91/5; 92/93; 180/247; 192/85 V
[58] Field of Search ............... 180/233, 247, 197;
92/93, 98 R, 99; 91/32, 166, 5; 192/85 V;
60/413

[56] References Cited

U.S. PATENT DOCUMENTS

| 3,334,545 | 8/1967 | Houser | 92/99 X |
| 4,577,741 | 3/1986 | Schmid | 192/85 V |
| 4,603,765 | 8/1986 | Cruijsen | 192/85 V |
| 4,733,574 | 3/1988 | Uchiyama | 180/247 X |

FOREIGN PATENT DOCUMENTS

| 85725 | 5/1983 | Japan | 180/247 |
| 24617 | 2/1986 | Japan | 180/233 |
| 282131 | 12/1986 | Japan | 180/247 |

Primary Examiner—Mitchell J. Hill
Attorney, Agent, or Firm—Burns, Doane, Swecker, Mathis

[57] ABSTRACT

A two wheel drive/four wheel drive change over apparatus for four-wheel drive vehicles includes an actuator having a vacuum chamber. A tank storing an engine vacuum through a check valve is integrally formed in the vacuum chamber, whereby the engine vacuum stored in the tank can be used for operating the actuator.

3 Claims, 1 Drawing Sheet

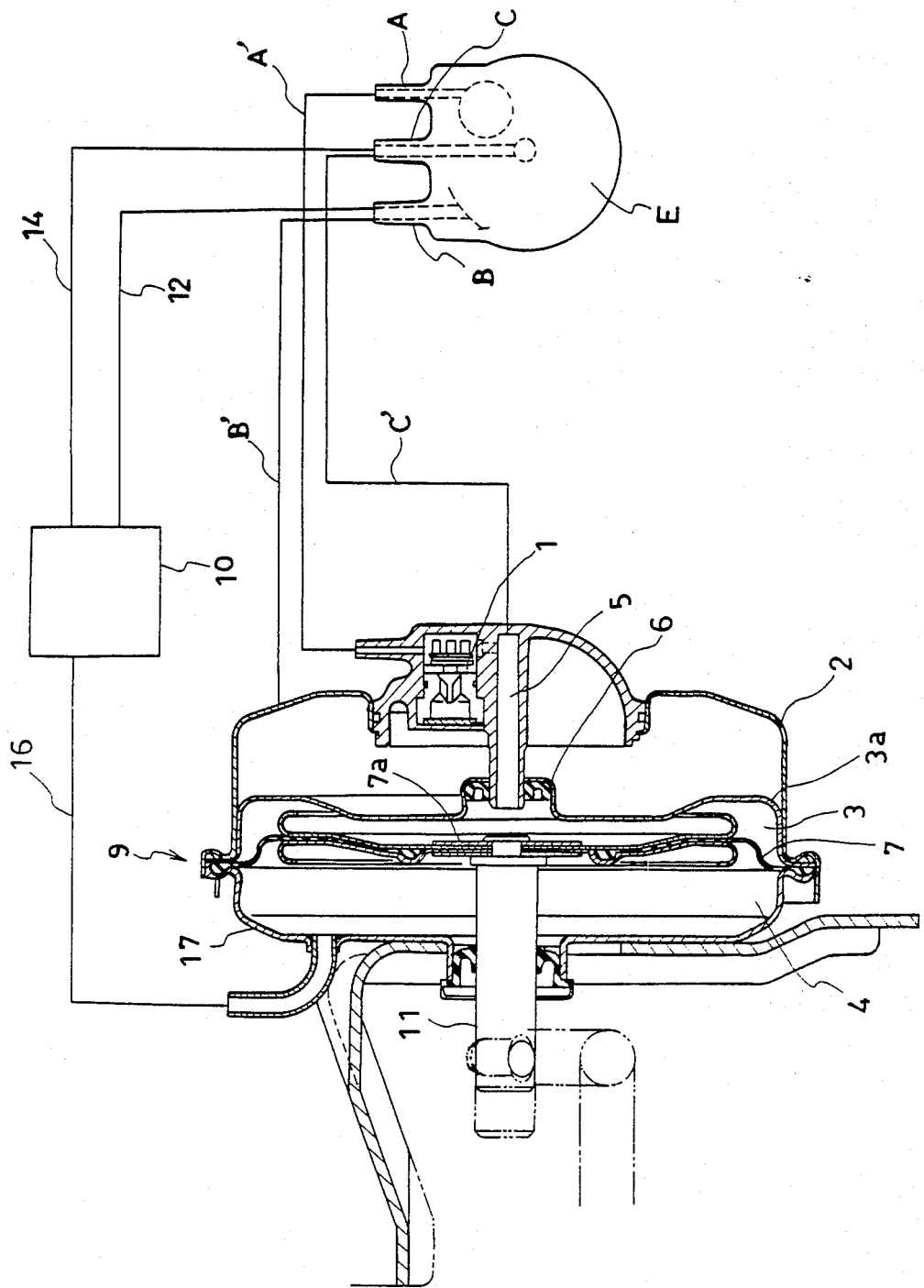

TWO WHEEL/FOUR WHEEL DRIVE CHANGE OVER APPARATUS FOR FOUR-WHEEL DRIVE VEHICLES

BACKGROUND OF THE INVENTION

1. Field of the Invention

This invention relates to a two wheel/four wheel drive change over apparatus for four-wheel drive vehicles.

2. Prior Art

A prior art two wheel/four wheel drive change over apparatus for four-wheel drive vehicles is disclosed in Japanese utility model application laid-open publication No. 58(1983)-2121, the disclosure of which is incorporated herein by reference. That document discloses a two wheel drive mode in which rotational power is transmitted from a transmission directly to either the front or rear wheels, and a four wheel drive mode wherein rotational power is transmitted to both the front and rear wheels by engagement of a transfer clutch. According to this prior art, there is provided an actuator which includes two chambers divided by a diaphragm. Each chamber is connected to a vacuum passage through an electromagnetic valve, and an engine vacuum supplied to both chambers is controlled by the electromagnetic valve, thereby operating the actuator. Since, in the prior art apparatus, the engine vacuum is introduced into the actuator directly from the engine, the fluctuation of the engine vacuum has a great influence on the apparatus, whereby the apparatus can be damaged by a change in the engine driving conditions. The engine vacuum is not generated during a full-open position of a throttle valve. Since the engine vacuum is generated during a constant driving or idling driving condition, only at this time can the supply of the engine vacuum be changed over.

SUMMARY OF THE INVENTION

It is, therefore, an object of the present invention to provide a novel two wheel/four wheel drive change over apparatus in which the above-mentioned prior art drawbacks can be eliminated.

According to the invention, there is provided a two wheel/four wheel drive change-over apparatus in which a tank storing an engine vacuum is integrally formed with a vacuum chamber of an actuator, whereby the engine vacuum stored in the tank can be used for operating the actuator.

BRIEF DESCRIPTION OF THE DRAWING

The sole FIGURE is a sectional view of a two wheel/four wheel drive change over apparatus showing an embodiment of the present invention.

DETAILED DESCRIPTION OF THE PREFERRED EMBODIMENT

Referring now to the FIGURE, a one-way check valve 1 of a conventional type is formed in a vacuum storing tank 2 and is physically positioned between an internal combustion engine vacuum inlet port A and a vacuum passage 5 of an actuator 9. The valve is formed in a housing which is integral with the tank. The check valve 1 maintains in the tank 2 the vacuum which is conducted through a conduit A' from the inlet port A. When the vacuum from the engire E falls, the check valve 1 is closed, thereby maintaining the vacuum in the tank 2.

The tank 2 is integrally formed with a vacuum chamber 3 of the actuator 9. The tank 2 and the vacuum chamber 3 are mutually separated by a rigid side wall 3a. The vacuum passage 5 is a vacuum conducting passage which is connected at one end to a port C via conduit C' and at the othe end to the vacuum chamber 3. The passage 5 penetrates the central portion of the side wall 3a, the latter opposing an axially moving wall 7a of a diaphragm 7.

A seal member 6 is located in the center of the side wall 3a to perform a sealing function. The diaphragm 7 forms one side of a vacuum chamber 4 which is connected with the port C through a conventional selectively actuable electromagnetic valve 10.

The tank 2 communicates with a port B by means of a conduit B'. The valve 10 communicates with the port B via conduit 12 and with the port C via conduit 14. The valve 10 communicates with the vacuum chamber 4 via vacuum passage 16. The valve 10 communicates with the vacuum in the tank 2 via conduits B' and 12 and introduces that vacuum into the vacuum chamber 3 via conduits 14 and C', and into the vacuum chamber 4 via vacuum passage 16. The latter extends through a rigid wall 17 of the actuator which opposes the diaphragm wall 7a.

Of course, other conduit arrangements can be utilized for interconnecting the tank with the valve, it being important that the tank is connected to the valve such that upon actuation of the valve 10, vacuum is supplied from the tank to the vacuum chambers.

Thus, vacuum pressure is supplied to both vacuum chambers through the valve 10. Variations in vacuum can be occasioned in a conventional manner in accordance with the operating characteristics of the internal combustion engine E. Differential vacuum pressures on opposite sides of the diaphragm wall will induce movement of that diaphragm wall.

In operation, the engine vacuum is introduced into the tank 2 from the port A through the check valve 1 and the conduit A'. When the engine vacuum changes so that the pressure increases, the check valve 1 is closed, thereby holding the vacuum in the tank 2. The vacuum is introduced into the vacuum chambers 3, 4 of the actuator 9 through the electromagnetic valve 10. A vacuum change-over control to the vacuum chambers 3, 4 is controlled by the electromagnetic valve 10. A shaft 11 is moved axially in response to the vacuum introduction into the vacuum chambers 3, 4 to actuate a conventional change-over clutch (not shown).

From the above explanation, the actuator is operated by the vacuum stored in the tank, thereby enabling the actuator to be operated continuously, regardless of the engine operating conditions. Also, the fluctuation of the engine vacuum will not influence the operation of the actuator. The tank is integrally formed with the actuator, thereby making the apparatus small in size and light in weight. Furthermore, since the vacuum conducting port is formed in the vacuum chamber wall surface opposed to the axially moving wall of the diaphragm, the diaphragm is prevented from being sucked into the inlet port during the vacuum introduction and also is prevented from being damaged.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. In a four wheel drive vehicle having an internal combustion engine and a change-over apparatus for changing between two wheel and four wheel drive, the improvement wherein said change-over apparatus comprises:

an actuator including vacuum chamber means for receiving vacuum, said vacuum chamber means having a movable diaphragm wall, vacuum conducting passage means opening into said vacuum chamber means and being positioned opposite to said diaphragm wall, a tank formed integrally with said actuator, first conduit means including a one-way check valve, communicating said tank with an engine vacuum, whereby a vacuum is stored in said tank, second conduit means communicating said tank with said vacuum conducting passage means for introducing a vacuum in said vacuum chamber means to move said diaphragm wall and change-over means for effecting a change-over between two wheel drive and four wheel drive, and said check valve being formed in a housing integral with said tank, said vacuum chamber means comprising two vacuum chambers, a first of said vacuum chambers defined by said diaphragm wall and a first rigid wall which separates said first vacuum chamber from the interior of said tank, a second of said vacuum chambers defined by said diaphragm wall and a second rigid wall of said actuator, said vacuum passage means comprising a first vacuum passage extending through said first rigid wall, and a second vacuum passage extending through said second rigid wall, said first and second rigid walls arranged in opposing relation to said diaphragm wall.

2. Apparatus according to claim 1, wherein said vacuum chamber means comprises first and second vacuum chambers mutually separated by said diaphragm wall, an electromagnetic valve operably disposed in said second conduit means for controlling the supply of vacuum from said tank to said vacuum chambers.

3. Apparatus according to claim 1, wherein said change-over means is a change-over shaft connected to said diaphragm wall for axial movement in response to movement of said diaphragm wall.

* * * * *